(12) United States Patent
Ponstein et al.

(10) Patent No.: US 11,624,164 B2
(45) Date of Patent: Apr. 11, 2023

(54) SELF-PROPELLED GROUND MILLING MACHINE

(71) Applicant: BOMAG GMBH, Boppard (DE)

(72) Inventors: Joachim Ponstein, Boppard (DE); Gerome Dzomo, Boppard (DE)

(73) Assignee: BOMAG GMBH, Boppard (DE)

(*) Notice: Subject to any disclaimer, the term of this patent is extended or adjusted under 35 U.S.C. 154(b) by 119 days.

(21) Appl. No.: 16/956,725

(22) PCT Filed: Dec. 19, 2018

(86) PCT No.: PCT/EP2018/000572
§ 371 (c)(1),
(2) Date: Aug. 19, 2020

(87) PCT Pub. No.: WO2019/120606
PCT Pub. Date: Jun. 27, 2019

(65) Prior Publication Data
US 2020/0392678 A1  Dec. 17, 2020

(30) Foreign Application Priority Data

Dec. 22, 2017 (DE) .................... 10 2017 011 977.5
Mar. 16, 2018 (DE) .................... 10 2018 002 170.0

(51) Int. Cl.
*E01C 23/088* (2006.01)
*B62D 33/06* (2006.01)
(Continued)

(52) U.S. Cl.
CPC ........ *E01C 23/088* (2013.01); *B62D 33/0617* (2013.01); *B62D 33/0621* (2013.01);
(Continued)

(58) Field of Classification Search
CPC .. E01C 2301/40; E01C 23/088; E01C 23/127; E01C 2301/00; E01C 2301/30;
(Continued)

(56) References Cited

U.S. PATENT DOCUMENTS 7,413,377 B2   8/2008  Pontano, III
8,186,763 B2   5/2012  Kramer et al.
(Continued)

FOREIGN PATENT DOCUMENTS

DE        19620072 A1 * 11/1997  ............. A01B 73/00
DE     202007005756      10/2008
(Continued)

OTHER PUBLICATIONS

English language machine translation of Secmair, French Patent Publication No. FR-2834731-A1, published Jul. 18, 2003 (4 pages) (Year: 2003).*

(Continued)

*Primary Examiner* — Abby J Flynn
*Assistant Examiner* — Michael A Goodwin
(74) *Attorney, Agent, or Firm* — Grossman, Tucker, Perreault & Pfleger, PLLC

(57) ABSTRACT

A self-propelled ground milling machine, in particular a road milling machine, a stabilizer or a recycler, comprising a machine frame borne by traveling devices, a ground milling device mounted on the machine frame having a milling drum box and a milling drum which can be rotated within the milling drum box about a rotation axis running transverse to a main working direction of the ground milling machine, and an operator platform from which the ground milling machine is operated by an operator, having an operator platform floor on which the operator can stand while operating the ground milling machine, having a main floor plate. What is now essential according to the invention (Continued)

Figure 1:
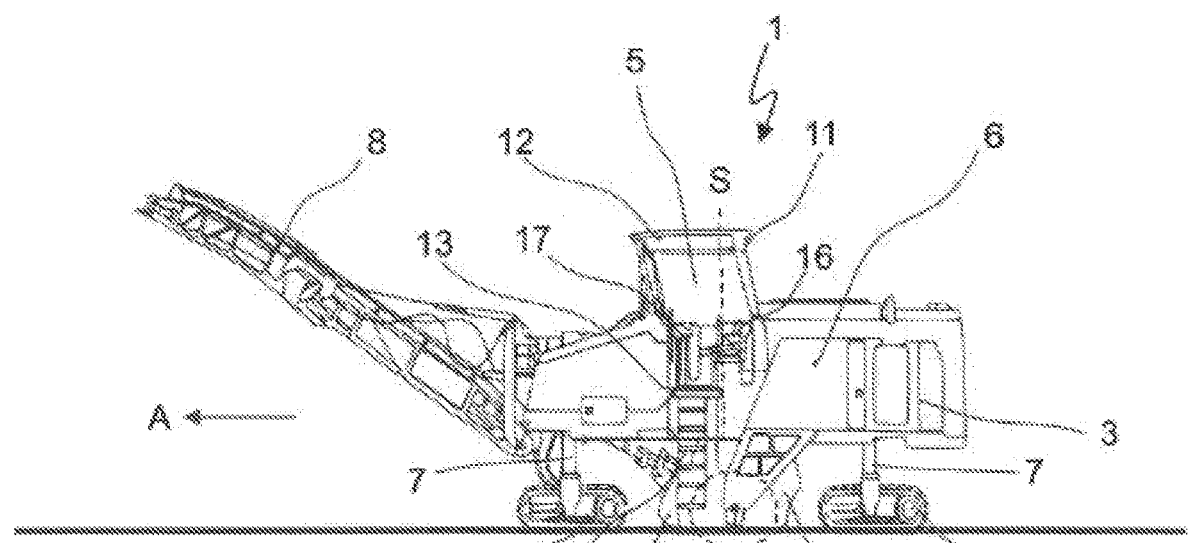

is that, in addition to the main floor plate, a side floor plate is provided which can be pivoted about a vertical axis or can be adjusted along a horizontal adjustment axis, and by means of which the standing area of the operator platform can be varied.

14 Claims, 4 Drawing Sheets

(51) Int. Cl.
  *E01C 23/12* (2006.01)
  *E02F 9/16* (2006.01)
(52) U.S. Cl.
  CPC ............ *E01C 23/127* (2013.01); *E02F 9/166* (2013.01); *E01C 2301/30* (2013.01); *E01C 2301/40* (2013.01)
(58) Field of Classification Search
  CPC ........ E21C 47/00; E21C 47/02; E02F 9/0833; E02F 9/16; E02F 9/163; E02F 9/166; B62D 33/06; B62D 33/0617; B62D 33/062; B62D 33/0621; B66C 13/54
  See application file for complete search history.

(56) References Cited

U.S. PATENT DOCUMENTS

| | | | |
|---|---|---|---|
| 9,764,690 B2 | 9/2017 | Thelen et al. | |
| 9,951,483 B2 | 4/2018 | Roetsch et al. | |
| 2008/0131204 A1* | 6/2008 | Pontano | E01C 19/48 404/83 |
| 2008/0258535 A1 | 10/2008 | Berning et al. | |
| 2009/0010713 A1* | 1/2009 | Kotting | E01C 19/004 404/128 |
| 2013/0195554 A1 | 8/2013 | Rukavina et al. | |
| 2016/0001818 A1* | 1/2016 | Thelen | E01C 23/088 299/39.4 |
| 2019/0161131 A1* | 5/2019 | Barimani | B60J 7/042 |

FOREIGN PATENT DOCUMENTS

| | | | | |
|---|---|---|---|---|
| DE | 102007033808 | | 1/2009 | |
| DE | 102008047583 | | 4/2010 | |
| DE | 102012022879 | | 2/2014 | |
| DE | 102012021378 A1 * | | 4/2014 | ........... E01C 23/088 |
| DE | 102015007562 | | 12/2015 | |
| DE | 102014011856 | | 2/2016 | |
| DE | 102016105886 | | 10/2017 | |
| EP | 1046748 B1 * | | 2/2007 | ........... E02F 9/0833 |
| EP | 2175070 | | 4/2010 | |
| FR | 2834731 | | 7/2003 | |

OTHER PUBLICATIONS

English translation of the International Search Report from corresponding PCT Appln. No PCT/EP2018/000572, dated Mar. 4, 2019.
English translation of the Written Opinion from corresponding PCT Appln. No. PCT/EP2018/000572, dated Mar. 4, 2019.
Office Action from related Chinese Appln. No. 201880082981.5, dated Jul. 14, 2021. English translation attached.

* cited by examiner

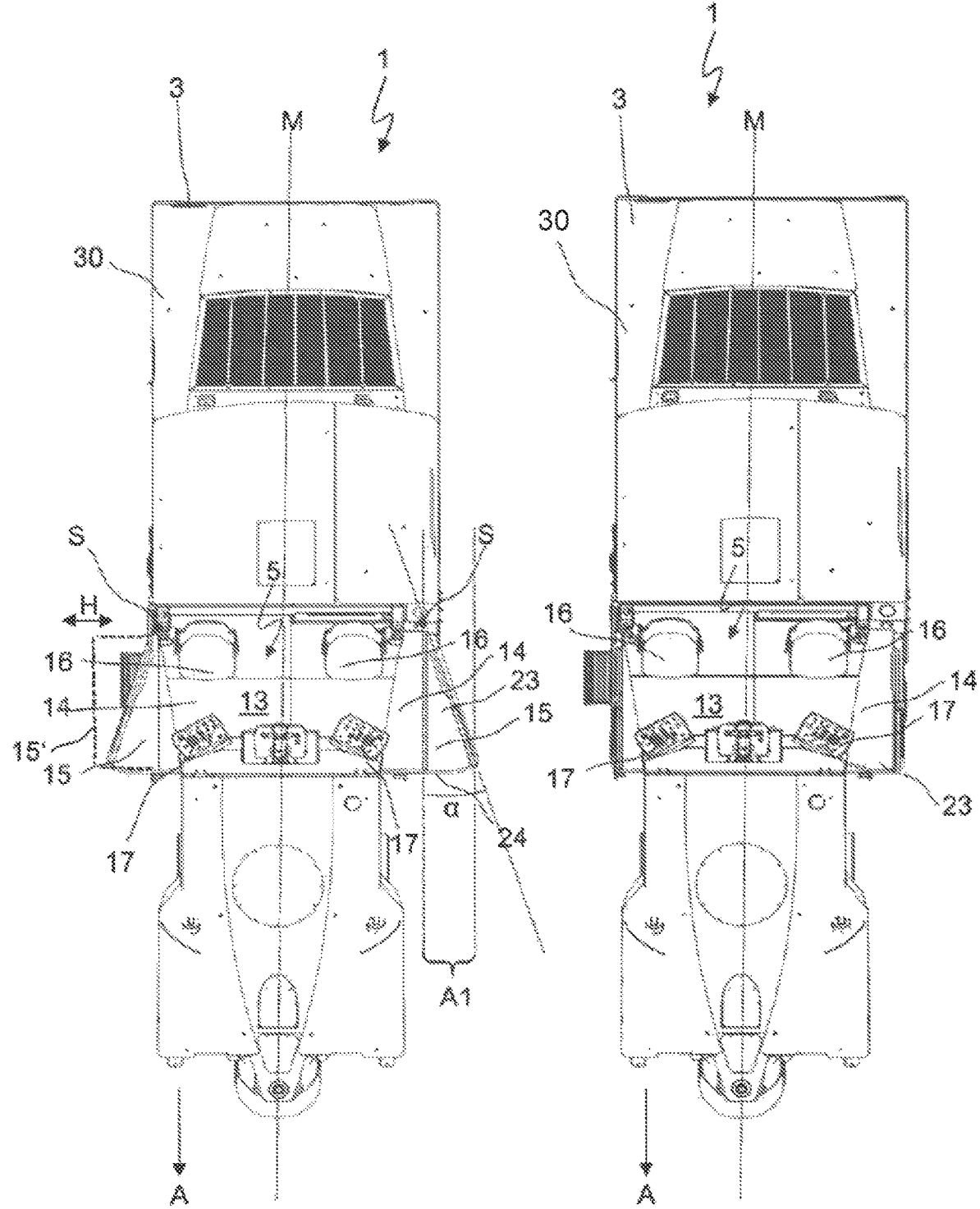

SELF-PROPELLED GROUND MILLING MACHINE

FIELD

The invention relates to a self-propelled ground milling machine, in particular a road cold milling machine, a stabilizer and/or a recycler.

BACKGROUND

Ground milling machines are per se known in the prior art. These machines are used, for example, to mill off road surfaces in the course of rehabilitation and/or repair works or to recycle road surfaces and/or to enable the incorporation of soil additives in runway and road construction. Examples of generic ground milling machines are disclosed, for example, in DE102012022879A1, DE102014011856A1 and DE102008047583A1.

Essential elements of a generic ground milling machine are a machine frame borne by traveling devices, a ground milling device mounted on the machine frame having a milling drum box and a milling drum which can be rotated within the milling drum box about a rotation axis running transverse to a main working direction of the ground milling machine. The provided traveling devices may be connected to the machine frame at least partially, and in particular completely, via height-adjustable lifting columns, for example, in order to be able to vary the milling depth. The ground milling device is connected to the machine frame, in particular through a direct connection of the milling drum box to the underside of the machine frame. The milling drum protrudes downwards beyond the milling drum box in a manner known per se and is immersed in the underlying ground to mill the latter during working operation. The main working direction of the ground milling machine here designates the movement direction of the ground milling machine over the underlying ground in which the machine usually or predominantly moves during the milling process. This is usually the forward direction of the ground milling machine. The ground milling machine is usually operated at least partially from an operator platform arranged on the machine frame on which one or more operators are present. The operator platform may be roofed and may comprise one or more operating panels and/or one or more driver seats. The operator platform further comprises an operator platform floor, which designates the floor area or area of the operator platform on which an operator can stand on the operator platform, in particular while operating the machine during traveling and/or working operation. The operator platform floor comprises a main floor plate, which designates a region of the operator platform that is essentially invariable with respect to the standing area for the operator and is in particular essentially stationary relative to the machine frame. Essentially stationary here also comprises variants in which a marginal movement of the operator platform floor relative to the machine frame is provided due to intermediate vibration damping devices, but in which the average position of the main floor plate relative to the machine frame does not change. Main floor plate here refers to the part of the operator platform floor that is invariable with respect to its size, or its standing area available to the driver. It does not necessarily have to consist of a single component plate, but may also consist of several individual parts. The floor plate may also comprise grid-like structures in some areas thereof. What is essential is that the main floor plate herein designates the standing floor of the operator platform floor on which an operator can stand to operate the ground milling machine and which has essentially fixed dimensions. Such a main floor plate may, for example, also comprise anti-slip coatings, damping mats or the like.

During milling works with a generic ground milling machine, the operator on the operator platform is often guided by orientation aids located in front of or beside the ground milling machine in the working direction, such as a milling edge. Furthermore, it is often desired that the operator can look from the operator platform as close as possible to at least the so-called zero side of the ground milling machine and/or to the side of the ground milling machine opposite the zero side when milling along obstacles, for example. The zero side of the ground milling machine designates the side on which the milling drum of the ground milling device is essentially flush with the outside of the ground milling machine. In order to enable a better viewing position for the operator on the operator platform of the ground milling machine, it is known to configure a railing delimiting the operator platform to the sides such that it can be swung out laterally about a horizontal axis so that the operator on the operator platform can easily lean out to the side and lean against the railing, which is then inclined. One of the problems with this solution is the uncomfortable inclined posture of the operator.

SUMMARY

The object of the invention therefore is to provide a way to create optionally improved visibility, in particular along a side of the ground milling machine, in a comfortable posture for an operator on the operator platform of a generic ground milling machine. At the same time, the compactness of the ground milling machine should not be permanently impaired.

According to the invention, in addition to the main floor plate, the operator platform floor has at least one side floor plate which is adjustable relative to the main floor plate about a vertical pivot axis between a stowed position and a deployed position, the side floor plate being arranged pivotably in such a manner that it pivots out from the stowed position into the deployed position in a horizontal direction and widens the operator platform floor transversely to the main working direction of the ground milling machine. Thus, the deployed position is in this case a pivoted-out position. Additionally or alternatively, it is also possible that the side floor plate is arranged such that it is configured to be displaceable between the stowed position and the deployed position along a horizontal direction which is in particular transverse, and more particularly perpendicular, to the main working direction or forward direction or longitudinal axis of the machine. The invention thus provides, in the form of the side floor plate, a standing region for the operator on the operator platform which is variable with regard to its position relative to the main floor plate. The movement of the side floor plate relative to the rest of the machine is in this case performed, for example, by a pivot movement about a vertical pivot axis. The stowed position designates a position in which the side floor plate provides the operator on the operator platform with a smaller standing area or no standing area at all compared to the deployed position. Moreover, during the pivot movement from the stowed position into the deployed position, the side floor plate moves in a horizontal direction partially away from the rest of the ground milling machine, thus widening, in addition to the main floor plate, in particular the standing area available to the operator on the operator platform in a horizontal direction and transversely to the main working direction. When working in spatially constricted environments and/or past obstacles and/or for transport purposes, for example, it may however be desirable for the ground milling machine to be as narrow as possible and, in particular, for the side floor plate to not project laterally beyond the rest of the machine. For this, the operator on the operator platform can pivot the side floor plate towards the rest of the machine and into the stowed position. In the stowed position, the side floor plate may provide no standing area whatsoever for the operator on the operator platform, for example because it is overlapped by the main floor plate. However, intermediate positions are also comprised by the invention. All in all, the invention thus enables a standing region within the operator platform which is variable with respect to the standing area and which the operator on the operator platform of the ground milling machine can vary according to the situation in an optimum manner with at least one side floor plate which can be adjusted between a stowed position and at least one deployed position. Additionally or alternatively, the side floor plate may also be adjustable along a horizontal axis, which likewise allows a transitional widening of the operator platform.

During the operation of ground milling machines, it is often desired to have good visibility in particular along at least one side of the ground milling machine, i.e. the right or left side in the main working direction, to enable, for example, precise milling works and reliable guidance of the ground milling machine, for example along ground markings. In this region, the machine frame of the ground milling machine usually comprises at least one vertically extending sidewall, for example as part of the support structure and/or the machine casing. It is now preferred that the side floor plate in the deployed position at least partially projects beyond the sidewall of the ground milling machine in a horizontal direction transverse to the main working direction, in particular to such an extent that the side floor plate projects transversely to the machine's longitudinal axis beyond the laterally outermost wall region in the horizontal plane and transverse to the machine's longitudinal axis. This allows the operator on the operator platform to assume a position at least partially closely next to the rest of the machine with the aid of the side floor plate, thus allowing him to look forward and/or backward along the respective sidewall in a particularly comfortable manner. With the aid of the side floor plate in the deployed position, a balcony-like structure is thus obtained on the ground milling machine, on which the operator can assume an optimum operating position with a very good view. In this case, the width of the ground milling machine (i.e., the extension of the ground milling machine in the horizontal plane and perpendicular to the longitudinal axis of the machine or the forward direction) is widened accordingly in the region of the side floor plate. For transport purposes in particular, however, it is preferable for the ground milling machine to be as compact as possible, especially also with regard to its width. Additionally or alternatively, it is therefore also preferred that the side floor plate in the stowed position does not project beyond the sidewall in a horizontal direction transverse to the main working direction. In the stowed position, the side floor plate thus assumes a position that does not widen the rest of the machine any further. This also makes it easier to travel past obstacles such as building walls.

The milling drum of the milling device is usually driven by the drive motor of the ground milling machine via a drive gear, for example a belt drive, which is connected to the milling drum in particular via an end face thereof. On the end face opposite said end face of the milling drum, the milling drum, or the milling device, is essentially flush with the remaining side of the ground milling machine to allow the most accurate possible work on this side. The side of the essentially flush alignment is also referred to as the zero side of the ground milling machine. It is now preferable for the side floor plate to be arranged on the zero side of the ground milling machine. This ensures that the driver on the operator platform of the ground milling machine has, especially on this side, a particularly good view along the zero side with the aid of the side floor plate in the deployed position. For this, the side floor plate is expediently arranged on the ground milling machine such that it is pivoted out beyond the zero side away from the rest of the machine. Particularly in the case of so-called center rotor milling machines, in which the milling drum is arranged on the machine frame between the front and rear traveling devices and spaced from the latter in the main working direction, it is then possible to arrange the side floor plate in the vertical direction essentially above the milling device and approximately in the middle of the longitudinal side of the machine or at the level of the ground milling device, which further improves the viewing position of the operator on the operator platform.

In practical work, the operator of the ground milling machine is particularly interested in the view in the main working direction in order to be able to see the region ahead of the milling device in the milling direction. For this reason, it is also preferable for the pivot axis of the side floor plate to be located in the rear region of the side floor plate in the main working direction of the ground milling machine, or to be offset rearward relative to the side floor plate. As a result, the pivoting path of the front area of the side floor plate in the main working direction of the ground milling machine is relatively larger and the additional standing area for the operator on the operator platform in the front area of the side floor plate is correspondingly larger due to the pivoting out of the side floor plate.

Depending on the work situation, improved visibility may be desired on the right and/or the left side of the operator platform. Accordingly, it is preferable for the operator platform to have a respective side floor plate on both sides of the operator platform. The driver on the operator platform can then optionally use the additional standing area available via the side floor plate on both sides of the machine. This is particularly advantageous for so-called milling machines, especially of the center rotor type.

The two opposite side floor plates are preferably arranged such that they are pivoted out/displaced from the stowed position into the deployed position in opposite directions of rotation and/or displacement. If, for example, the right-hand side floor plate, viewed in the main working direction, pivots out into the deployed position in a clockwise direction, the left-hand side floor plate, viewed in the main working direction, thus preferably pivots out into the deployed position in a counter-clockwise direction. Additionally or alternatively, the two side floor plates may also be arranged and/or configured in a mirror-symmetrical manner, with the symmetry axis running along the longitudinal center line of the ground milling machine.

It is preferable for the side floor plate in the stowed position to be positioned as far as possible in such a manner that it does not obstruct the operator's freedom of movement on the operator platform. Therefore, the side floor plate is advantageously arranged vertically below the main floor plate at least in the stowed position. The side floor plate is thus preferably stowed below the main floor plate in the stowed position. In this manner, the pivoted-in side floor plate is prevented from obstructing the operator's freedom of movement on the main floor plate in any form.

In practical work, it is often the case that the operator on the operator platform leans out sideways over the operator platform, for example to obtain a further improved view of the side region of the ground milling machine. In this connection, it is known to provide the operator platform with a fall protection device, in particular in the form of a railing, against which the driver can support himself towards the outside. In connection with the present invention, it is now preferred that a fall protection device is provided which is adjustable between the deployed position and the stowed position together with the side floor plate, in particular also about the rotation axis of the side floor plate. An optimal solution is therefore a fall protection device which is movable between the deployed position and the stowed position together with the side floor plate, in particular in the form of a railing, so that the driver can lean against the fall protection device both when the side floor plate is in the outer position and when it is in the stowed position. If it moves along with the side floor plate, it is ensured that the fall protection device is always optimally aligned relative to the operator platform.

In an ideal configuration, the fall protection device is stationary relative to the side floor plate, in particular directly connected to the latter. In this manner, the joint adjustability of the side floor plate together with the fall protection device can be achieved in a relatively simple way. Moreover, the fall protection device is usually located at handle or waist height for an operator standing on the main floor plate of the operator platform. If the fall protection device is stationary relative to the side floor plate, the operator can indirectly adjust the position of the side floor plate according to his current needs by adjusting the fall protection device. This type of actuation is particularly comfortable.

The fall protection device may further comprise a compensation device or a compensation member which compensates for the gap between the fall protection device and the rest of the machine which opens up when the fall protection device is pivoted from the stowed position into the deployed position together with the side floor plate. This may be, for example, a chain or also a telescopic railing element. What is essential is that this compensation device bridges the distance from the fall protection device fixed relative to the side floor plate depending on the pivot position and thus enables an overall continuous fall protection regardless of the current position of the side floor plate.

In a specific embodiment, the side floor plate is essentially planar. Additionally or alternatively, the, in particular planar, side floor plate may be slanted relative to the vertical pivot axis at an angle of less than 90° to 80° with respect to its standing area. In other words, the side floor plate is in this case inclined relative to the vertical pivot axis with respect to its standing area. This embodiments thus enables a laterally ascending standing area of the side floor plate, which may be advantageous in individual cases. This variant may also be combined with an adjustment mechanism via which the side floor plate is displaced vertically along the pivot axis when pivoting between the stowed position and the deployed position, for example using a lift and pivot gear. This may be done, for example, via a suitable spiral groove guide or the like, as will be explained in more detail below.

The side floor plate and the main floor plate are preferably arranged relative to one another in such a manner that they overlap in the vertical direction when the side floor plate is in the pivoted-out and/or in the stowed position. This prevents the formation of a free space between these two elements that is open downwards in the vertical direction. However, a step constituting a height offset in the vertical direction may then occur in the step-over region from the main floor plate to the side floor plate, which may cause a tripping hazard. For this reason, it is preferable if a trip protection device is provided which compensates for or reduces a vertical offset of the side floor plate to the main floor plate. The trip protection device is thus generally configured such that it counteracts a sudden step-over edge between the side floor plate and the main floor plate.

The trip protection device is preferably configured, for example, as a compensation lip, in particular a rubber lip, which is arranged on the main floor plate and at least partially overlaps the side floor plate in a horizontal direction. Starting from the main floor plate, this compensation lip thus overlaps the surface of the side floor plate or sweeps over the latter. In the case that the side floor plate is arranged vertically below the main floor plate, the compensation lip is shaped as a wedge sloping downward from the main floor plate towards the side floor plate. Additionally or alternatively, the compensation lip in the region of the main floor plate may protrude in the vertical direction partially upwards over the remaining standing area of the main floor plate. As a result, a floor elevation is created that can be felt by the operator on the operator platform, so that he notices when he steps over from the main floor plate to the side floor plate.

Additionally or alternatively, the trip protection device may, for example, also be configured such that it causes a displacement of the side plate along its rotation axis upon adjustment of the side plate between its stowed position and its deployed position. To this end, the side plate is slanted in particular at an angle of less than 90° to 80° relative to the vertical pivot axis with respect to its standing area. In this case, the side plate now may, for example, be pushed upwards along the pivot axis when being pivoted from the stowed position into its deployed position, so that the vertical offset between the side floor plate and the main floor plate is at least partially compensated in the vertical direction.

Additionally or alternatively, a thrust pivot guide, for example a spiral guide, may also be provided between the side floor plate and the main floor plate, in particular as part of a pivot bearing by means of which the side floor plate is pivotably mounted on the rest of the machine, such that the side floor plate is at least partially displaced in the vertical direction along the rotation axis during movement between the stowed position and the deployed position. For this, the spiral guide may, for example, be a spiral groove of a bearing sleeve on the side of the side floor plate, which is engaged by a guide pin of a machine-side bearing shaft of the pivot bearing. The spiral guide may further be configured such that it causes a continuous vertical adjustment of the side floor plate. It is, however, also possible that the spiral guide causes a discontinuous vertical adjustment of the side floor plate, in particular in such a manner that a vertical adjustment of the side floor plate is achieved only towards the end of the pivot movement from the stowed position into the deployed position of the side floor plate. For this, the side floor plate may, in its edge region facing the rest of the machine, have a step element offset downwards in the vertical direction which lies below the main floor plate when the side floor plate is in the deployed position. The offset in this case preferably corresponds approximately to the thickness of the main floor plate in the vertical direction in the connection area to the side floor plate, so that in this way an almost offset-free transition between the main floor plate and the part of the side floor plate projecting laterally beyond the main floor plate is obtained in the vertical direction.

It is also possible to make the vertical offset between the side base plate and the main base plate relatively small or in several steps. Here, it has proved to be particularly advantageous if the side floor plate has several plate segments which are arranged in a fan-like manner, offset to one another in the vertical direction and adjustable relative to one another, especially about the rotation axis. With this embodiment, the individual plate segments may, for example, be relatively narrow in their vertical thickness, so that overall several stair-like offset steps are obtained which pose a relatively low individual risk of tripping. Said several plate segments preferably all pivot about the vertical pivot axis.

The pivoting angle of the side floor plate between a maximally deployed position and the stowed position in the horizontal plane about the vertical pivot axis is preferably less than 90°, in particular less than 60°, and/or more than 15°, in particular more than 20°.

Preferably, a pivot limitation device is further provided in the direction of the stowed position and/or in the direction of at least one maximally deployed position. The pivot limitation device is configured such that it prevents the side floor plate from moving beyond a predetermined position. This is in particular a suitable stop between the side floor plate and a machine-side element to ensure a defined position of the side floor plate in the stowed position and/or the deployed position.

To enable the positioning of the side floor plate to be safely maintained in the deployed an/or stowed position, a locking device is preferably provided which is configured such that it locks the side floor plate in at least one defined stowed position and/or in at least one defined deployed position. The side floor plate is thus locked in the respective position with the aid of the locking device. If the side floor plate is to be moved out of this position, the locking device must first be moved from its locking position to a release position, i.e. the lock must be released. Such a locking device may be, for example, a socket pin in combination with aligned locking holes in the side floor plate and/or the main floor plate and/or a machine frame part or other bearing part. Generally, the locking device is preferably configured as a positive locking device and/or frictional locking device acting against the pivot movement.

Further variations of the locking device are possible with regard to the specific definition of the deployed position and the stowed position. For example, the locking device may be configured such that it allows stepless and/or incremental locking of the side floor plate relative to the main floor plate at least within a defined adjustment range and in particular over the entire adjustment range between the stowed position and the maximally deployed position. This thus allows the operator to define more than the one deployed position and the one stowed position for the positioning of the side floor plate. It may be, for example, a clamping device, for example in the sense of a locking brake. It may, however, also be preferable for the locking device to be configured such that the side floor plate can only be locked in a single deployed position and/or the stowed position as this modified configuration according to the invention is relatively easy to operate.

In addition or as an alternative to the locking device, a transport lock may further be provided which locks the side floor plate in the stowed position. This is therefore also a device by means of which the side floor plate can be locked in a defined position, in this case the stowed position. However, the main purpose of the transport lock is to ensure that the side floor plate will not unintentionally swing out from the stowed position during the transport of the ground milling machine, for example on a low-bed loader. The transport lock may in particular also be configured such that it can be operated from outside the ground milling machine. A possible specific configuration of the transport lock may, for example, be provided in the form of a safety hook and/or bracket which causes a positive lock of the side floor plate in the stowed position, said positive lock being between the side floor plate and the rest of the machine.

It is generally possible and preferable for the adjustment of the side floor plate between the deployed position and the stowed position to be performed manually by the operator on the operator platform. Depending on the size and/or position of the side floor plate, it is however also possible that a drive device is provided which drives the adjustment of the side floor plate from the stowed position towards the deployed position and/or from the deployed position into the stowed position at least in addition to a manual actuation. Therefore, this comprises, on the one hand, embodiments in which the adjustment of the side floor plate is fully driven, for example with the aid of an electric or hydraulic motor operated by the operator, or only partially and supportively driven. The latter may comprise, for example, auxiliary drive devices such as gas pressure springs, mechanical springs, etc.

Generic ground milling machines are usually provided with a step-up aid which facilitates the operator's access from the ground to the operator platform. Such a step-up aid may in particular be a ladder or stairs. According to the invention, it is now preferred that the step-up aid is arranged in front of or behind the side floor plate as seen in the main working direction of the ground milling machine. This ensures that the step-up aid is not included in the movement of the side floor plate between the stowed position and the deployed position and is thus either stationary relative to the main floor plate or is at least movable relative to the main floor plate independently of the side floor plate. The latter may be the case, for example, if the step-up aid is adjustable to a desired stowed position for transport purposes.

The operator platform of a generic ground milling machine often has at least one operating device and/or a driver's seat arranged thereon. The at least one operating device can be used to operate machine functions, such as driving and/or steering movements, and/or the operation of the milling device and/or the height adjustment of the milling device relative to the underlying ground. This may be, for example, an operating panel. In this connection, it is already known that the at least one operating device and/or the driver's seat are adjustable between at least two positions, for example if an operation is to be performed from the right-hand or left-hand side of the operator platform and/or from a position leaning sideways out of the operator platform and a normal position. According to the invention, it is now preferred that the adjustment of the at least one operating device and/or the driver's seat between said at least two positions is at least partially coupled to the adjusting movement of the side floor plate between the stowed position and the deployed position via a coupling device. Thus, when the driver adjusts the side floor plate, the coupling device simultaneously causes an adjustment of the at least one operating device and/or the driver's seat. This has the advantage that, in addition to adjusting the side floor plate, the driver also adjusts the essential elements of the operating device and/or driver's seat, so that he does not have to adjust these elements individually and one after the other between the various adjustment positions. Such a coupling device may, for example, be an adjusting gear, in particular a thrust pivot gear or the like, with which the adjusting mechanism of the at least one operating device and/or the driver's seat is coupled to the adjusting mechanism of the side floor plate in a motion-transmitting manner. Alternatively, this coupling may also be made electronically with the aid of, for example, suitable pushbutton switches, a control unit and a suitable drive motor. The operating device and/or the driver's seat may also be articulated to or mounted on the side floor plate.

Additionally or alternatively, it is finally also preferred that at least one operating device and/or a driver's seat are arranged on the operator platform, the operating device and/or the driver's seat being adjustable such that they can be adjusted from a normal position in which they are positioned in the vertical direction completely above the main floor plate to a lateral operating position in which they project at least partially into the region located in the vertical direction above the side floor plate in the pivoted-out position. In this case, the space gained by the side floor plate in the deployed position is thus also used in the vertical direction above the side floor plate for the arrangement of at least one operating device and/or said one driver's seat. This is advantageous in that, for example, the operator can then operate the ground milling machine from an identical posture both when the side floor plate is pivoted out and the operating device and/or the driver's seat are in the lateral operating position and when the side floor plate is in the stowed position and the operating device and/or the driver's seat are in the normal position.

BRIEF DESCRIPTION ON THE DRAWINGS

Figure 2A:
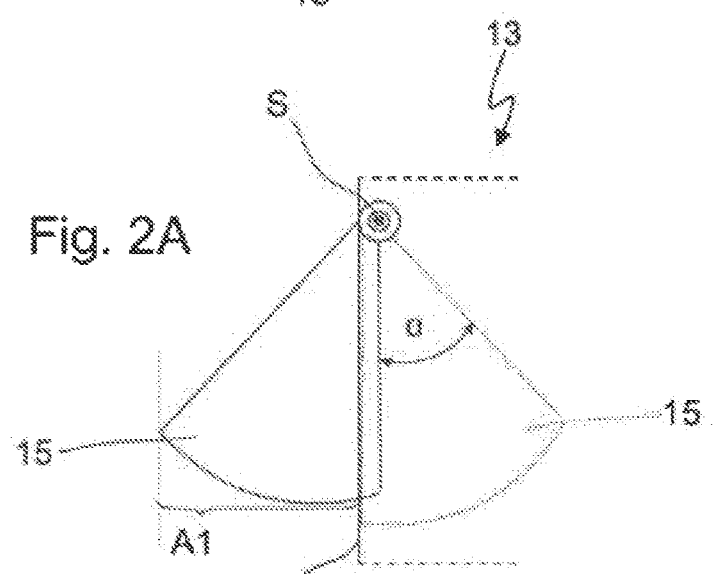
Figure 2B:
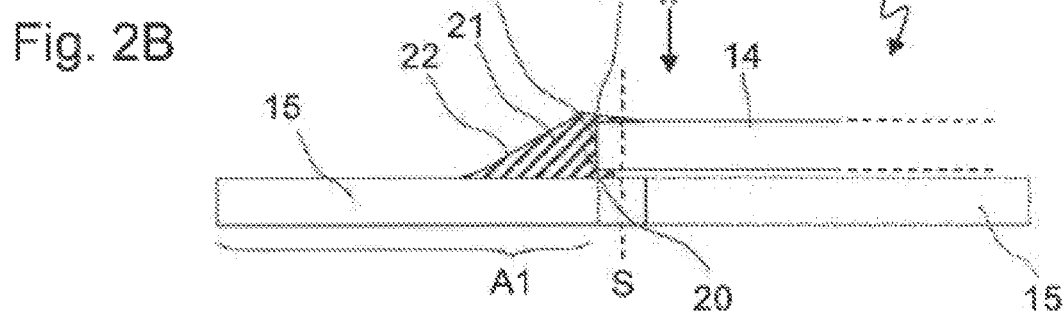
Figure 4A:
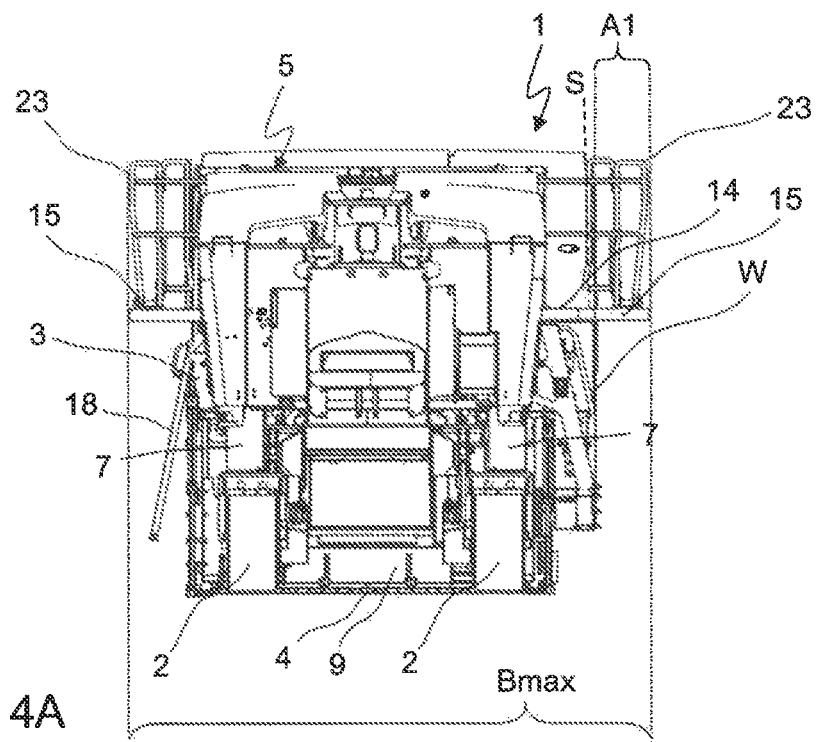
Figure 4B:
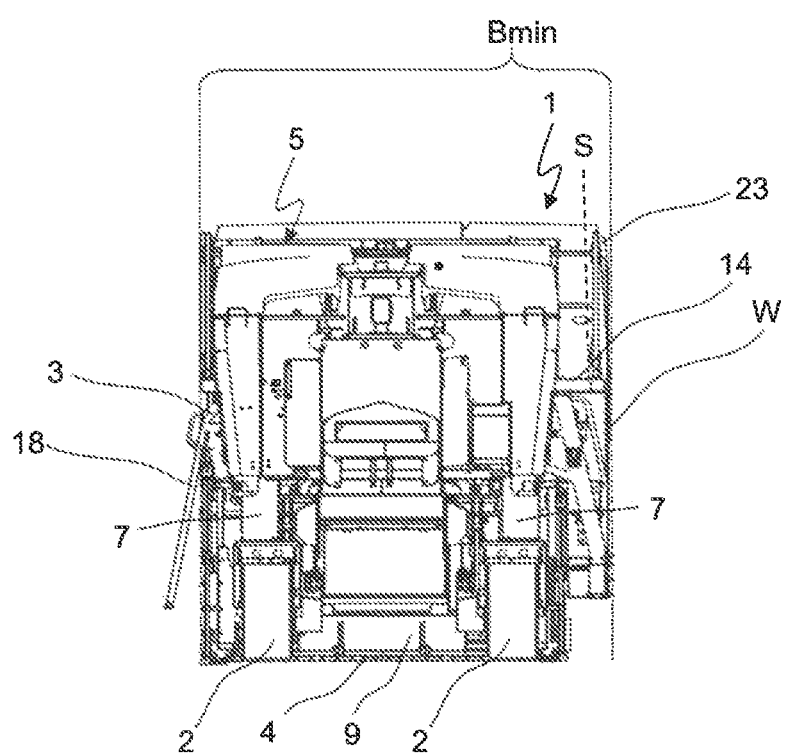
Figure 5:
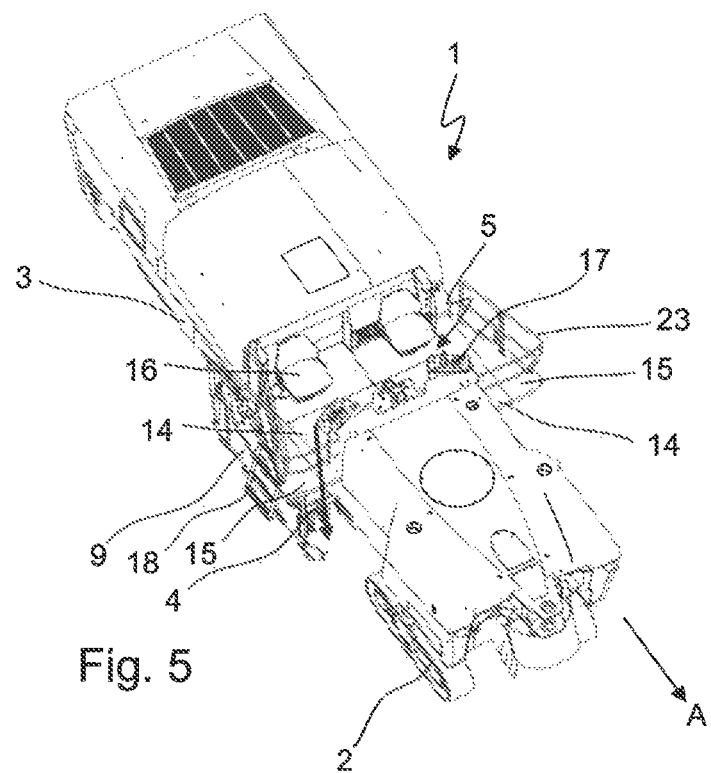
Figure 6:
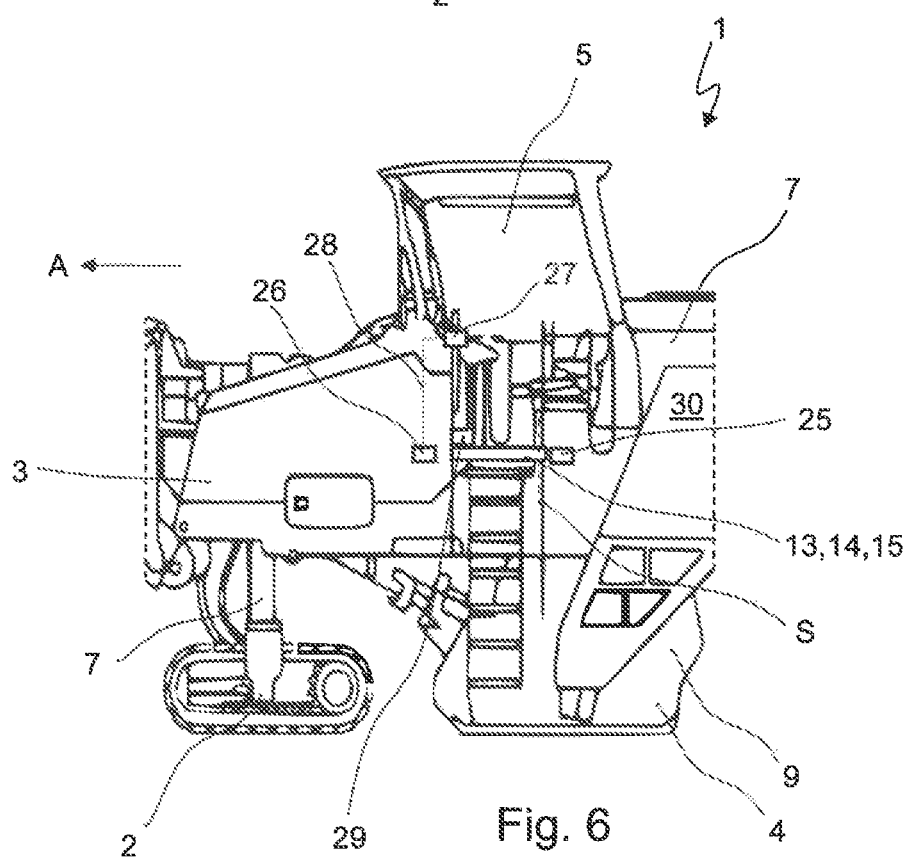

The invention will be explained in more detail below by reference to the embodiment examples shown in the figures. In the schematic figures:

FIG. 1: is a side view of a ground milling machine;

FIG. 2A: is a top view of a part of a main floor plate and a side floor plate in the deployed position and in the stowed position;

FIG. 2B: is a side view of a part of the main floor plate and the side floor plate in the deployed position and in the pivoted-in position of FIG. 2A;

FIG. 3A: is a top view of a ground milling machine with side floor plates in the deployed position;

FIG. 3B: is a top view of a ground milling machine with side floor plates in the stowed position;

FIG. 4A: is a front view of the ground milling machine of FIG. 3A;

FIG. 4B: is a front view of the ground milling machine of FIG. 3B;

FIG. 5: is a perspective oblique view of the ground milling machine of FIGS. 3A and 4A; and FIG. 6: is a side view of a part of a ground milling machine according to another embodiment.

DETAILED DESCRIPTION

Like components are designated by like reference numerals in the figures, although not every recurring component is necessarily designated separately throughout the figures.

Essential components of a ground milling machine 1 include a machine frame 3 borne by traveling devices 2, more specifically crawler tracks or wheels, a ground milling device 4, an operator platform 5, and a drive motor 6. The present embodiment example further comprises lifting columns 7 connecting the machine frame 3 to the traveling devices 2 in a height-adjustable manner, as well as a loading conveyor 8, which can be used to load milled material onto a transport vehicle, for example (the loading conveyor 8 is not shown in the embodiment example shown in FIGS. 3A to 5 for reasons of clarity). In working operation, the ground milling machine 1 moves in the working direction A over the underlying ground and mills it to a desired milling depth. The ground milling machine 1 is self-propelled. The energy required for the traveling and working operation is provided by the drive motor 6, usually a diesel combustion engine. The ground milling device 4 comprises a milling drum box 9 and a milling drum 10 (indicated by dashed lines in FIG. 1) which can be rotated within the milling drum box 9 about a rotation axis R running transverse to the main working direction A of the ground milling machine 1, said milling drum being a hollow-cylindrical support tube having a plurality of milling tools arranged on its outer jacket surface, as known per se.

The operator platform 5 may have an operator platform roof 12 held by struts 11. The operator platform 5 further comprises an operator platform floor 13 with a main floor plate 14 and a side floor plate 15, as will be explained in more detail in the following figures. Further, a driver's seat 16 and an operating panel 17 are arranged on the operator platform 15. The operator platform 5 is accessed from the ground using a laterally arranged step-up aid 18, in this case a ladder.

What is now essential is that, with the aid of the side floor plate 15, the operator platform floor 13 provides a variable standing area for the operator on the operator platform 5. For further explanation, reference is first made to FIG. 2A. Said figure shows a top view of the operator platform floor 13 comprising the main floor plate 14 (only a portion of which is shown in FIG. 2A) as well as the side floor plate 15, which can pivot about a vertical pivot axis S. FIG. 2A first illustrates that the side floor plate 15 is adjustable relative to the main floor plate 14 about the pivot axis S, the deployed position of the side floor plate 15 in FIG. 2A being indicated by a solid line and the stowed position of the side floor plate 15 by a dotted line. This variant, which is based on a pivot movement, thus involves a pivoted-out position. It can be seen that the side floor plate 15 protrudes in a horizontal direction beyond the lateral outer edge 19 of the main floor plate 14 and projects beyond the latter in a horizontal direction by the distance A1. In the stowed position, on the other hand, the main floor plate 14 is positioned above the side floor plate 15 and completely overlaps the side floor plate 15. This is illustrated further in FIG. 2B, which shows a side view along arrow I of FIG. 2A. The viewing direction of FIG. 2A is illustrated by arrow II in FIG. 2B. In FIG. 2B, the side floor plate 15 is again illustrated by solid lines in the deployed position and by dotted lines in the pivoted-in position. In the deployed position, the side floor plate 15 protrudes horizontally beyond the main floor plate 14 by the distance A1. In FIG. 2B, the driver on the operator platform 5 thus stands on the main floor plate 14 and, if possible, on the side floor plate 15. The combination of the two FIGS. 2A and 2B thus shows that this standing area can be increased by the side floor plate 15 when in the deployed position. On the other hand, the operator platform 4, or its standing area for the operator on the operator platform, widens horizontally and transversely to the longitudinal center line M (FIGS. 3A and 3B) of the machine by the distance A1 when the side floor plate 15 is pivoted out. In the stowed position, however, the side floor plate 15 completely disappears below the main floor plate 14, so that the standing area of the operator platform 4 is not widened in this case.

FIG. 2A further shows the respective end positions of the side floor plate 15 in the deployed position and in the stowed position. The pivoting angle between these two positions is indicated in FIG. 2A by the angle α. In the present embodiment example, this angle is about 45°.

FIG. 2B also shows a trip protection device 20 in the form of a rubber lip 21 projecting from the outer edge 19 of the main floor plate 14 in a horizontal direction and, coming from above, partially resting on the side floor plate 15. It comprises a compensation slope 22 which compensates the vertical offset between the standing area formed by the side floor plate 15 and the main floor plate 14 in a uniformly sloping manner. This reduces the risk of tripping in the step-over region between the main floor plate 14 and the side floor plate 15. The rubber lip 21 further comprises a marking bump 40 projecting or protruding vertically upwards from the standing area of the main floor plate 14. This enables the driver on the operator platform 4 to sense the step-over zone between the main floor plate 14 and the side floor plate 15 with his foot early on, which also reduces the risk of tripping.

FIGS. 3A, 3B, 4A, 4B and 5 now show a ground milling machine 1 comparable to that of FIG. 1, with the loading conveyor 8 and the operator platform roof 12 removed. Both on the right-hand side with respect to the main working direction A, where the milling device, which is not visible in FIGS. 3A and 3B, is essentially flush with the machine side, so that this side is also referred to as the zero side, and also on the left side, the ground milling machine 1 comprises in each case a respective side floor plate 15 which is adjustable between the deployed position shown in FIG. 3A/4A/5 and the stowed position shown in FIG. 3B/4B. By way of example, the pivot angle for the left side floor plate 15 is indicated by α in FIG. 3A. FIGS. 3A and 3B are top views of the machine, FIGS. 4A and 4B are front views against the working direction A, and FIG. 5 is an oblique perspective view from the upper right.

FIGS. 3A to 5 illustrate in particular that the pivoted-out side floor plates 15 widen the machine width transversely to the working direction A in the horizontal plane and increase the standing area of the operator platform 5 especially in this direction. For further illustration, FIGS. 3A and 4A indicate the distance Al, which denotes the widening of the floor standing area in the horizontal plane and transverse to the working direction A, which is achieved by pivoting the respective side floor plate 15 from the pivoted-in position to the pivoted-out position. This provides a larger standing area for the operator on the operator platform 5. The pivot axes S of the two side floor plates 15 are further arranged in the rear region of the respective side floor plate 15 as seen in the main working direction A. As a result, the space gained by the pivoted-out side floor plate 15 in the main working direction A at the front is particularly large for the operator on the operator platform 5. This enables him, for example, to look along the side of the machine in the main working direction A in particular from this region. As set forth prior, during the operation of ground milling machines, it is often desired to have good visibility in particular along at least one side of the ground milling machine 1, i.e. the right or left side in the main working direction, to enable, for example, precise milling works and reliable guidance of the ground milling machine 1, for example along ground markings. In this region, the machine frame 3 of the ground milling machine 1 usually comprises at least one vertically extending sidewall 30.

A comparison of FIGS. 3A and 3B or 4A and 4B further shows that the operator platform 5 partially protrudes laterally beyond the rest of the respective machine side when the side floor plates 15 are in the deployed position. In FIG. 4A, this is further illustrated by an indication of the lateral machine frame wall W, which constitutes the maximum horizontal extension of the machine to this side (the further provided step-up aid 18 can be folded in and is thus not considered for the machine width in this region). If, on the other hand, the side floor plates 15 are in the stowed position, as is shown in FIG. 3B, the operator platform 5 terminates essentially flush with the rest of the rear sidewall of the ground milling machine 1 at the level W (FIG. 4B). In other words, when the side floor plates 15 are in the stowed position, the width of the operator platform 5 is within the maximum width of the rest of the ground milling machine. This is particularly advantageous during the transport of the ground milling machine 1. For further clarification, FIG. 4A shows the maximum machine width Bmax with side floor plates on both sides in pivoted-out position, while FIG. 4B shows the considerably smaller minimum machine width Bmin with side floor plates on both sides in pivoted-in position (again, the separately foldable step-up aid 18 is not included).

FIGS. 3A, 3B and 5 further show that on the operator platform 5 there are, arranged in respective pairs, a right pair of an operating device 17 and a driver's seat 16 and a right pair of an operating device 17 and a driver's seat 16. In the present embodiment example, these are adjustable in the horizontal direction, in particular adjustable horizontally from the position shown in FIGS. 3A and 3B towards the outside of the ground milling machine. The adjustment may be to such an extent that the respective driver's seat 16 and/or the respective operating device 17 can be adjusted so as to at least partially overlap the respective side floor plate 15 in the vertical direction.

In the embodiment example according to FIGS. 3A/4A, 3B/4B and 5, a fall protection device is further provided in the form of a railing protruding vertically upwards from the side floor plate 15. Said railing is connected to the side floor plate 15 in a stationary manner and pivots together with the latter between the stowed position and the deployed position. From the operator platform 5, the operator can thus simultaneously move the side floor plate 15 between the stowed position and the deployed position by displacing the fall protection device 23. Part of the fall protection device 23 is also a compensation member 24 which variably compensates the free space relative to the rest of the machine created by the movement of the fixed railing part from the stowed position into the deployed position. Said compensation member may be, for example, a chain or a telescopic intermediate railing member.

FIG. 5 in particular illustrates that the visibility from the operator platform to the ground region ahead of the milling drum, which is particularly relevant for the operation of the machine, is improved due to the side floor plate 15 in the deployed position. The side floor plates 15 are positioned vertically above the milling device. In the deployed position, the operator on the operator platform thus obtains a balcony-like structure above the milling device from which he can look directly to the ground region lying in the working direction A ahead of the respective edge of the milling drum.

FIG. 6 finally illustrates further modifications of the basic idea of the invention. FIG. 6 shows a portion of the machine of FIG. 1. As is shown, the ground milling machine 1 of FIG. 6 comprises a transport lock 25 which in the present case is arranged approximately at the level of the operator platform floor 13 for operation from outside the ground milling machine 1. With the aid of the transport lock 25, the side floor plate 15 can be locked in its stowed position.

Furthermore, additionally or alternatively, a drive device 26 is provided which, at least in addition to purely manual operation, drives the adjustment of the side floor plate between the stowed position and the deployed position. This may be a mechanically acting drive device 26, such as a gas pressure spring or a mechanical spring, or also a drive motor. It may be actuated by an operator on the operator platform 5 from an actuating device 27, which is connected to the drive device 26 via a signal line 28, to adjust the side floor plate 15. Furthermore, a locking device 29 may be provided, in the present case in the form of a foot pedal operated from the operator platform 5, by means of which the side floor plate 15 can be locked in the deployed position and/or the stowed position from the operator platform 5. This is in particular a suitable positive locking device which blocks the pivot movement of the side floor plate 15 about its pivot axis S in its respective locking position. The locking device 29 may in this case be configured such that it locks the side floor plate 15 only in the stowed position and/or in a single deployed position, usually the maximally deployed position. It is, however, also possible to configure the locking device 29 such that it enables the side floor plate 15 to be locked in a stepped manner with several intermediate steps or steplessly between the stowed position and a maximally deployed position.

According to an alternative and/or supplement to the pivot variant described above, the side floor plate is displaceable along a horizontal axis, in particular transversely and more particularly perpendicularly to the working direction A, in particular linearly, between the stowed position and the deployed position. This is illustrated as an example in FIG. 3A with the side floor plate 15' shown in the deployed position using dashed lines. In this case, the side floor plate 15' is thus displaced linearly in the horizontal plane. To reach the stowed position, the side floor plate 15' is displaced linearly along the horizontal axis H towards the rest of the machine until it has reached the stowed position already described above. Reference is made in this regard to the above disclosure. Combinations between pivot and displacement movements along one axis are also possible.

What is claimed is:

1. A self-propelled ground milling machine, comprising:
   a machine frame borne by traveling devices;
   a ground milling device mounted on the machine frame and having a milling drum box and a milling drum which is rotatable within the milling drum box about a rotation axis running transverse to a main working direction of the ground milling machine;
   an operator platform from which the ground milling machine is operated by an operator, having an operator platform floor on which the operator can stand during operation of the ground milling machine, with a main floor plate,
   wherein, in addition to the main floor plate, the operator platform floor has at least one side floor plate which is adjustable relative to the main floor plate about a vertical pivot axis or along a horizontal adjustment axis between a stowed position and a deployed position,
   wherein the side floor plate is either arranged pivotably in such a manner that it pivots out horizontally from the stowed position into the deployed position and widens the operator platform floor transversely to the main working direction of the ground milling machine or is arranged so as to be displaceable such that it extends horizontally from the stowed position into the deployed position and widens the operator platform floor transversely to the main working direction of the ground milling machine,
   wherein the ground milling machine has at least one vertically extending sidewall, and that the side floor plate does not project horizontally beyond the sidewall transversely to the main working direction when in the stowed position, and
   wherein the ground milling machine has a zero side on which the ground milling device is essentially flush with a sidewall of the machine frame of the ground milling machine, and that the side floor plate is arranged on the zero side of the ground milling machine.

2. The ground milling machine according to claim 1, wherein the side floor plate at least partially projects horizontally beyond the sidewall transversely to the main working direction when in the deployed position.

3. The ground milling machine according to claim 1, wherein the pivot axis of the side floor plate is located in a rear region of the side floor plate in the main working direction of the ground milling machine, or is rearward relative to the side floor plate.

4. The ground milling machine according to claim 1, wherein the operator platform has a respective side floor plate on both sides of the operator platform, wherein the two side floor plates pivot out from the stowed position into the deployed position in opposite directions of rotation or adjustment.

5. The ground milling machine according claim 1, wherein the side floor plate is arranged vertically below the main floor plate at least in the stowed position.

6. The ground milling machine according to claim 1, wherein a fall protection device is provided which is adjustable between the deployed position and the stowed position together with the side floor plate also about the pivot axis of the side floor plate.

7. The ground milling machine according to claim 6, wherein the fall protection device is stationary relative to the side floor plate.

8. The ground milling machine according to claim 1, wherein the side floor plate is essentially planar and is slantable relative to the vertical pivot axis at an angle with respect to its standing area.

9. The ground milling machine according to claim 1, wherein a trip protection device is provided which compensates or reduces a vertical offset between the side floor plate and the main floor plate.

10. The ground milling machine according to claim 1, wherein the side floor plate is displaceable at least partially in the vertical direction along the pivot axis during a movement between the stowed position and the deployed position.

11. The ground milling machine according to claim 1, wherein a pivoting angle ($\alpha$) of the side floor plate between a maximally deployed position and the stowed position is less than 90°.

12. The ground milling machine according to claim 1, wherein a locking device is provided which is configured such that it locks the side floor plate in at least one defined stowed position and/or in at least one defined deployed position, wherein the locking device is configured such that it allows stepless or incremental locking of the side floor plate relative to the main floor plate within a defined adjustment range.

13. The ground milling machine according to claim 1, wherein a locking device is provided which is configured such that it allows stepless or incremental locking of the side floor plate relative to the main floor plate over an entire adjustment range between the stowed position and a maximally deployed position.

14. The ground milling machine according to claim 1, wherein it includes at least one of the following features:
- a transport lock is provided which locks the side floor plate in the stowed position;
- a drive device is provided which drives the adjustment of the side floor plate from the stowed position towards the deployed position and/or from the deployed position into the stowed position at least in addition to a manual operation;
- a step-up aid is provided to facilitate access from the ground to the operator platform;
- at least one operating device and/or a driver's seat are arranged on the operator platform, wherein the operating device and/or the driver's seat are adjustable, wherein the adjustment of the operating device and/or the driver's seat is at least partially coupled to the adjusting movement of the side floor plate between the stowed position and the deployed position; and/or
- at least one operating device and/or a driver's seat are arranged on the operator platform, wherein the operating device and/or the driver's seat are laterally adjustable.

\* \* \* \* \*